(12) United States Patent
Weiss et al.

(10) Patent No.: US 9,042,146 B2
(45) Date of Patent: May 26, 2015

(54) DC PRE-CHARGE CIRCUIT

(75) Inventors: Bruce W. Weiss, Milwaukee, WI (US); Doyle F. Busse, Muskego, WI (US); Jeremy J. Keegan, Kewaskum, WI (US); Lixiang Wei, Whitefish Bay, WI (US); Michael W. Loth, Germantown, WI (US); Rangarajan M. Tallam, Germantown, WI (US); Yogesh Patel, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 258 days.

(21) Appl. No.: 13/548,685

(22) Filed: Jul. 13, 2012

(65) Prior Publication Data
US 2013/0121051 A1  May 16, 2013

Related U.S. Application Data

(60) Provisional application No. 61/559,650, filed on Nov. 14, 2011.

(51) Int. Cl.
*H02M 7/537* (2006.01)
*H02H 7/09* (2006.01)
*H02M 7/48* (2006.01)

(52) U.S. Cl.
CPC .. *H02H 7/09* (2013.01); *H02M 7/48* (2013.01)

(58) Field of Classification Search
CPC ........................................................ H02M 7/537
USPC .................. 363/50–53, 55, 56.01–56.03, 131; 307/10.7
See application file for complete search history.

(56) References Cited

U.S. PATENT DOCUMENTS

| 7,468,565 B2 * | 12/2008 | Hoshiba | 307/10.1 |
| 7,830,036 B2 * | 11/2010 | Wei et al. | 307/31 |
| 8,063,506 B2 * | 11/2011 | Sakata et al. | 307/10.7 |

OTHER PUBLICATIONS

User Manual Active Front End Unit (AFE), Vacon Driven by Drives, pp. 1-93, http://www.vacon.com/ImageVaultFiles/id_2783/cf_2/Vacon-NX-AFE-User-Manual-ud01190B-EN.PDF (accessed Nov. 29, 2012).
Hardware Manual, ACS800-11 Drives (5.5 to 110 kW), ACS800-11 Drives (7.5 to 125 HP), ABB, May 5, 2006, pp. 1-126, http://www05.abb.com/global/scot/scot201.nsf/veritydisplay/055992b565d4ae88c1257790004a79ad/$file/en_acs800_11_hw_b_updatenotice.pdf.
Sinamics G150, Converter Cabinet Units 75 kW to 1500 kW, Operating Instructions, Siemens, Oct. 2008, pp. 1-490, http://cache.automation.siemens.com/dnl/DQ/DQxNzMxNQAA_35201129_HB/g150-operating-instructions-1008-en.pdf (accessed Nov. 29, 2012).

* cited by examiner

*Primary Examiner* — Adolf Berhane
*Assistant Examiner* — Yemane Mehari
(74) *Attorney, Agent, or Firm* — Fletecher Yoder, P.C.

(57) ABSTRACT

Systems and methods are provided for pre-charging the DC bus on a motor drive. Pre-charging techniques involve pre-charge circuitry including a manual switch, an automatic switch, and pre-charge control circuitry to switch the automatic switch between pre-charge and pre-charge bypass modes in response to an initialized pre-charge operation, input voltage sags, and so forth. In some embodiments, the pre-charge operation may be initialized by switching the manual switch closed. In some embodiments, the pre-charge operation may be initialized by a detected voltage sag on the DC bus. The pre-charge circuitry may also be configured to disconnect to isolate a motor drive from the common DC bus under certain fault conditions.

26 Claims, 9 Drawing Sheets

DC PRE-CHARGE CIRCUIT

CROSS-REFERENCE TO RELATED APPLICATIONS

This application claims the benefit of U.S. Provisional Application No. 61/559,650, filed Nov. 14, 2011.

BACKGROUND

The invention relates generally to the field of electrical drives. More particularly, the invention relates to techniques for pre-charging a direct current (DC) bus in a power drive.

In the field of power electronic devices, a wide range of circuitry is known and currently available for converting, producing, and applying power to loads. Depending upon the application, motor drive systems may include circuitry that converts incoming power from one form to another as needed by the load. In a typical drive system, for example, a rectifier converts alternating current (AC) power (such as from a utility grid or generator) to direct current (DC) power. Inverter circuitry can then convert the DC signal into an AC signal of a particular frequency desired for driving a motor at a particular speed. The inverter circuitry typically includes several high power switches, such as insulated-gate bipolar transistors (IGBTs) that are controlled by drive circuitry. Motor drive systems also often include power conditioning circuitry, including capacitors and/or inductors, which remove undesirable ripple currents from its DC bus.

Sometimes during operation of a motor drive system, and particularly during start-up, high levels of in-rush current may be received by a motor drive in the motor drive system, which may cause various adverse affects to the motor drive. To avoid these high levels of in-rush current during start-up, a typical motor drive system may include pre-charge circuitry that applies a smaller initial current to the DC bus of the motor drive system prior to actually starting the motor drive. The pre-charge circuitry charges a number of capacitors coupled to the inverter before applying a full source voltage to the inverter. Such techniques may be referred to as pre-charging the DC bus.

Typical pre-charge techniques may include increasing a firing angle of semiconductor devices (e.g., thyristor) in a rectifier until capacitors on a DC bus are charged to some level or connecting a resistor with a contactor in parallel such that the resistor is bypassed via the contactor after the DC capacitors are charged. Other pre-charge circuitry may involve a three-way switch, which may connect the DC bus, pre-charge the DC bus, or disconnect the DC bus. However, such configurations may result in significant power loss through the diode and may not be used to isolate the drive from the common DC bus. Furthermore, each of the above described pre-charge circuit configurations and techniques involve using one or more circuit breakers to isolate or disconnect a drive from the common DC bus, which increases the overall size of each drive.

BRIEF DESCRIPTION

The present invention relates generally to techniques for pre-charging a DC bus on a motor drive system. Specifically, pre-charge circuitry includes a manual switch, an automatic switch, and pre-charge control circuitry to switch the automatic switch between a pre-charge mode and a pre-charge bypass mode. In some embodiments, the pre-charge mode may be initialized by manually closing the manual switch. Once the pre-charge operation is complete, the automatic switch may be automatically closed by the pre-charge control circuitry, and the inverter circuitry of the motor drive may begin to operate. In certain embodiments, the pre-charge control circuitry may detect various fault conditions, such as voltage drops in the DC bus and/or faults within the motor drive systems. When such conditions are recognized, the pre-charge control circuitry may open the automatic switch such that the motor drive system is in its pre-charge mode, and the DC bus may be recharged during voltage drops. Further, by opening the automatic switch, the motor drive system may isolate its drive from the common DC bus to protect its drive from the various fault conditions.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Systems and methods of the present invention are related to pre-charging a DC bus on a motor drive in a motor drive system. During operation of a motor drive system, and particularly during start-up, motor drive circuitry (e.g., inverter, capacitors) may draw high levels of in-rush current while charging power-conditioning capacitors associated with the motor drive. Typically, motor drive configurations include pre-charge circuitry, which applies a smaller initial current to the DC bus of the motor drive prior to starting the motor drive. The smaller current provided to the DC bus may charge DC capacitors (i.e., power-conditioning capacitors) that may be coupled to the DC bus. Pre-charging the capacitors with the smaller initial current may protect the capacitors from possible damage that may be caused by the high levels of in-rush current during start-up. Some existing pre-charge techniques may not be suitable for addressing line sags (e.g., drops in the DC bus voltage) which may occur after the motor drive has begun to operate. Moreover, some existing techniques may not isolate the motor drive from various faults, which may damage the motor drive. Embodiments of the present disclosure include pre-charge circuitry that may be suitable for addressing line sags during drive operation and for isolating a drive from a common DC bus under certain fault conditions. Furthermore, in some embodiments, the pre-charge circuitry configuration may utilize automatic switches, such as molded case switches, to provide drive isolation without the use of a circuit breaker. Such embodiments may be sufficiently compact to fit in a single cabinet in a motor drive system.

Figure 1:
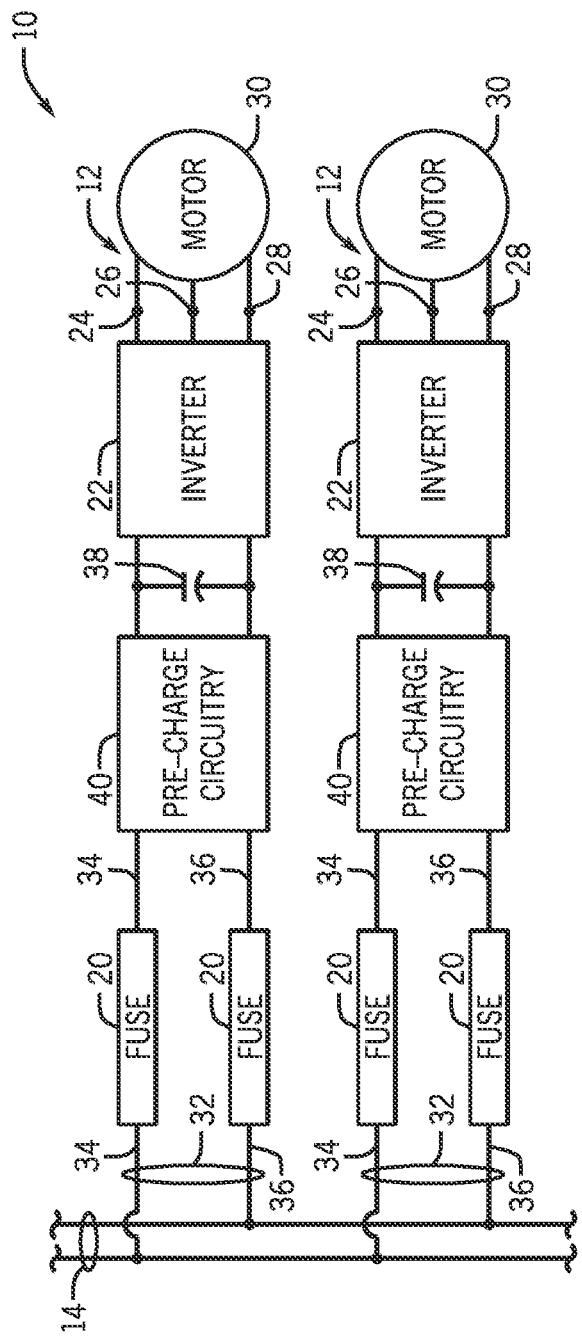
FIG. 1 is a diagrammatical representation of a power distribution network, in accordance with an embodiment.

FIG. 1 is a diagrammatical representation of a power distribution network 10 in accordance with an embodiment of the techniques described herein. The power distribution network 10 may include one or more motor drives 12 coupled to a common bus 14 through a DC bus 32 having a high side (+v) 34 and low side (−v) 36. As shown in FIG. 1, the DC bus 14 may provide power to several motor drives 12. It should be noted, however, that in some embodiments the DC bus 14 may be dedicated to a single motor drive 12. Furthermore, the DC bus 14 may be powered by any DC source known in the art, such as a battery, a solar panel, or a rectified AC source. In some embodiments the DC bus 14 may be powered by an 18-pulse, active front-end rectifier.

The motor drive 12 may include an inverter 22 that generates a three phase output waveform at a desired frequency for driving a motor 30 connected to the output terminals 24, 26 and 28. The motor drive 12 may also include a capacitor 38 connected between the high side 34 of the DC bus 32 with the low side 36 of the DC bus 32. In some embodiments, the capacitor 38 may be configured to smooth the DC voltage waveform my removing AC ripples from the common DC bus 14 such that the internal DC bus may carry a waveform closely approximating a true DC voltage.

In some embodiments, the motor drive 12 may include a pre-charge circuit 40 that reduces the in-rush current that may otherwise occur when power is first applied to the motor drive 12. A high in-rush current can be facilitated, in part, by the capacitor 38, which may briefly behave like a short-circuit after voltage is applied to the local DC bus 32 and before the capacitor 38 has stored sufficient charge. Generally, the pre-charge circuit 40 may reduce in-rush current by controlling an initial charging current to the capacitor 38 during an initial charging stage in which the capacitor 38 charges to the approximate bus voltage.

In some embodiments, each motor drive 12 may include a fuse 20 on each of the high side 34 and low side 36 of the DC bus 32. The fuse 20 may be suitable for providing load breaking for elements in the pre-charge circuit 40, as will be discussed in greater detail. In some embodiments, the fuse may be a resistor or any suitable sacrificial device that provides current protection (e.g., during a short circuit) to pre-charge circuit elements.

Figure 2:
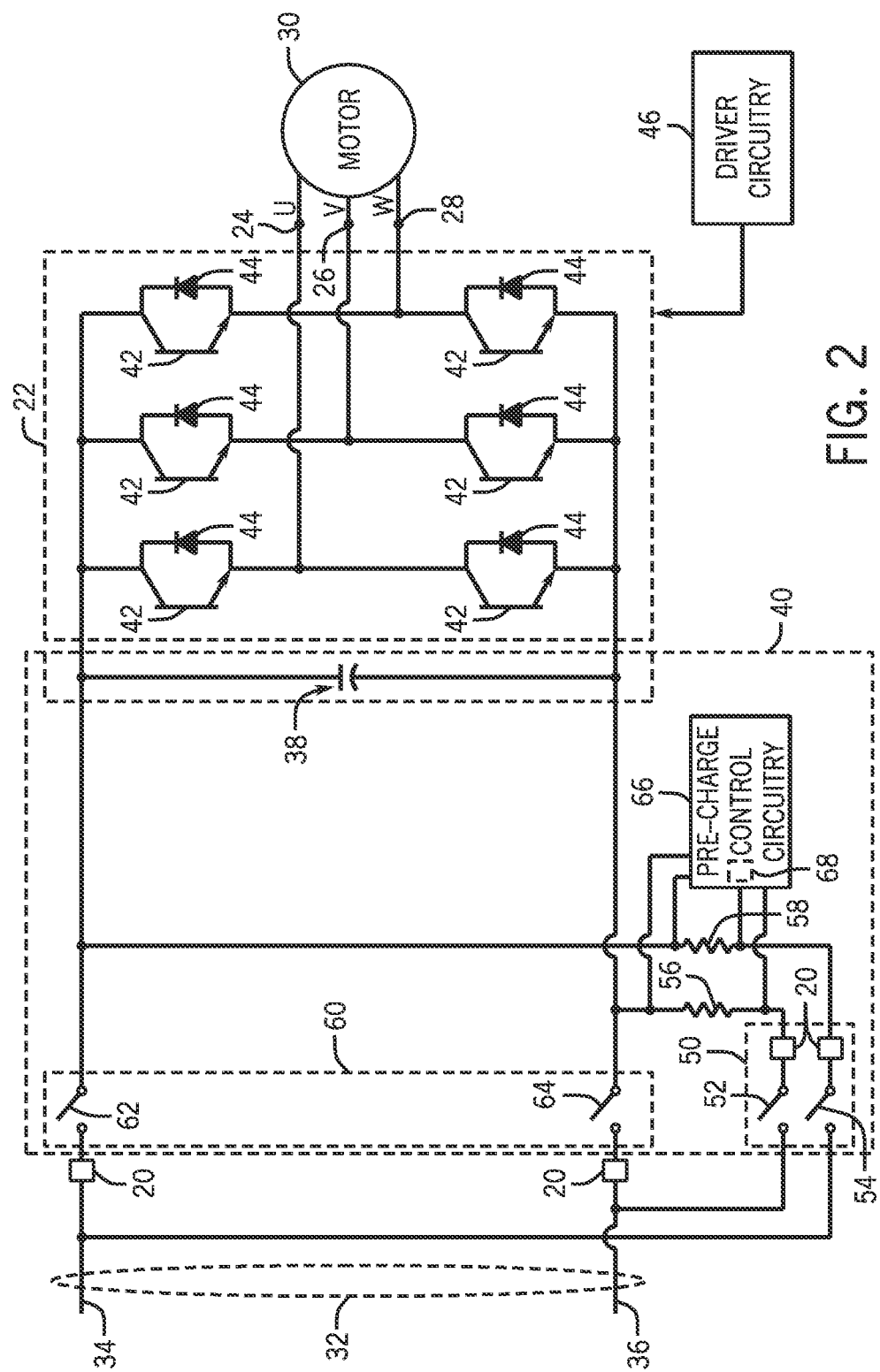
FIG. 2 is a diagrammatical representation of pre-charge circuitry in a motor drive of FIG. 1, in accordance with an embodiment.

FIG. 2 is a diagrammatical representation of a portion of a motor drive 12 illustrated in FIG. 1 that employs pre-charge circuitry 40 in accordance with an embodiment of the present techniques. The motor drive may include an inverter 22 having an arrangement of solid state switches 42, such as power metal-oxide semiconductor field-effect transistors (MOSFETs) or insulated gate bipolar junction transistors (IGBTs), for example. In some embodiments, a pair of switches 42 may be coupled in series, collector to emitter, between the high side 34 and the low side 36 of the internal DC bus 32. In the illustrated embodiment of FIG. 2, three of these pairs of switches are coupled in parallel to the internal DC bus 32 for a total of six switches 42. Each switch 42 is arranged in parallel and in opposite direction to a diode 44, where the collector of the switch 42 is coupled to the anode and the emitter of the switch 42 is coupled to the cathode. Each of the output terminals 24, 26, and 28 is coupled to one of the switch outputs between one of the pairs of switches 42. Furthermore, driver circuitry 46 may be coupled to the inverter 22 to generate a three-phase output waveform. In some embodiments, driver circuitry 46 may be connected to each of the switches 42 to cause the switches 42 to switch rapidly in a particular sequence so as to generate an approximately sinusoidal output waveform.

The inverter 22 may be connected to the internal DC bus 32 in parallel with a capacitor 38 and with the pre-charge circuitry 40. The pre-charge circuitry 40 may include manual switches 50. The manual switches 50 may include a high side manual switch 54 connected in series to pre-charge resistor 58 and parallel to the high side 34 of the DC bus 32. The manual switches 50 may also include a low side manual switch 52 connected in series to pre-charge resistor 56 and parallel to the low side 36 of the DC bus 32. The pre-charge circuitry 40 also includes automatic switches 60 including a high side automatic switch 62 in the high side 34 of the DC bus 32 and a low side automatic switch 64 in the low side 36 of the DC bus 32. The automatic switches 60 may be controlled by pre-charge control circuitry 66 in the pre-charge circuitry 40. The pre-charge control circuitry 66 may include a communication component, a processor, a memory, a storage, input/output (I/O) ports, and the like. The communication component may be a wireless or wired communication component that may facilitate communication between the pre-charge control circuitry 66, the manual switches 50, the automatic switches 60, and the like. The processor may be any type of computer processor or microprocessor capable of executing computer-executable code. The memory and the storage may be any suitable articles of manufacture that can serve as media to store processor-executable code. These articles of manufacture may represent computer-readable media (i.e., any suitable form of memory or storage) that may store the processor-executable code used by the processor to perform the presently disclosed techniques.

In some embodiments, the automatic switches 60 may be a motorized molded case switch, and the pre-charge control circuitry 66 may control the opening or closing of the automatic switches 60 by applying power to a coil or motor of the automatic switches 60. The pre-charge control circuitry 66 may be connected to each side of the pre-charge resistors 56 and 58 to sense the voltage drop across the pre-charge resistors 56 and 58. Based on the sensed voltage drop, the pre-charge control circuitry 66 may control the opening or closing of the automatic switches 60. In some embodiments, the pre-charge control circuitry 66 may also include a transformer 68 configured to provide power to various pre-charge operations. For instance, the transformer 68 may power one or more coils or motors for closing or opening the automatic switches 60.

Generally, while the capacitor 38 is charging during a pre-charge operation, the manual switches 50 are closed while the automatic switches 60 are open, and the pre-charge control circuitry delivers power through the closed manual switches 50. Because the automatic switches 60 are open, the pre-charge current may flow through the closed manual switches 50 and the pre-charge resistors 56 and 58, and the current draw on the DC bus 32 may be controlled to an acceptable value known in the art while the capacitor 38 charges. After a suitable time period has elapsed, or after a threshold voltage on the DC bus 32 has been met (as measured across the pre-charge resistors 56 and 58), the pre-charge control circuitry 66 may close the automatic switches 60 to bypass the pre-charge resistors 56 and 58, thereby automatically disconnecting the pre-charge resistors 56 and 58 from the motor drive 12. Because the capacitor 38 will have been charged to a voltage close to the DC bus voltage, excessive in-rush currents may be substantially avoided.

In some embodiments, a fuse 20 may be configured on each of the high side 34 and low side 36 of the DC bus 32 between the manual switches 50 and the automatic switches 60. For example, a first fuse 20 may be between the high side automatic switch 62 and the high side manual switch 54 and a second fuse 20 may be between the low side automatic switch 64 and the low side manual switch 52. The fuse 20 may be any suitable element (e.g., a resistor, a sacrificial wire) suitable for providing load breaking for the automatic switches 60. In some instances, such as during a short circuit, the fuse 20 may provide a disconnect means for the automatic switches 62 and 64 to protect the automatic switches 62 and 64. Furthermore, in some embodiments, fuses 20 may also be configured with the manual switches 50 to protect the manual switches from influxes of current.

Figure 3A:
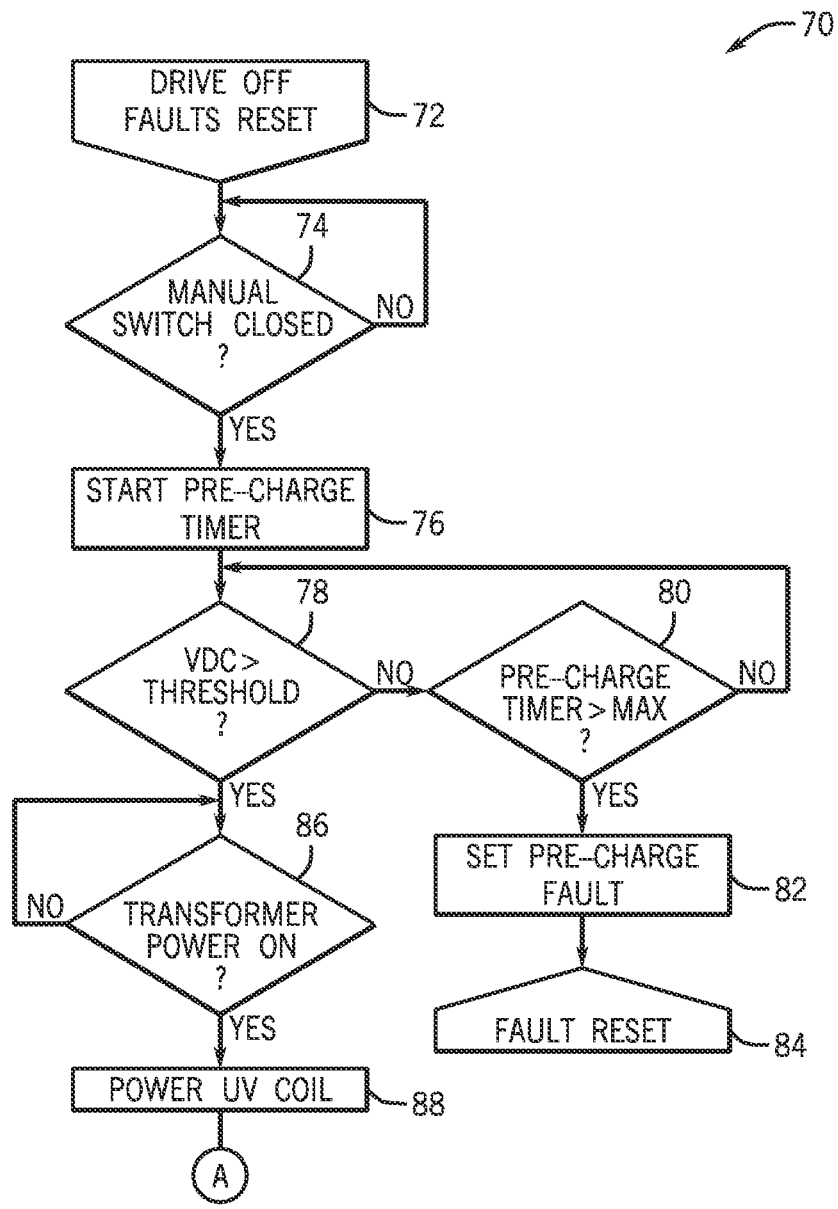
FIGS. 3A-3B illustrate a flow chart representing a process for pre-charging a capacitor on the DC bus in the motor drive of FIG. 2, in accordance with an embodiment.
Figure 3B:
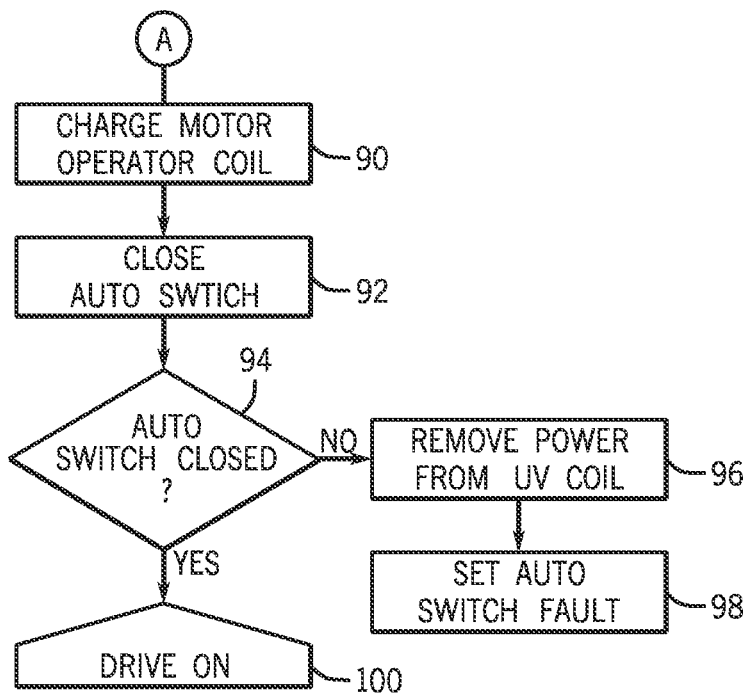
Figure 4A:
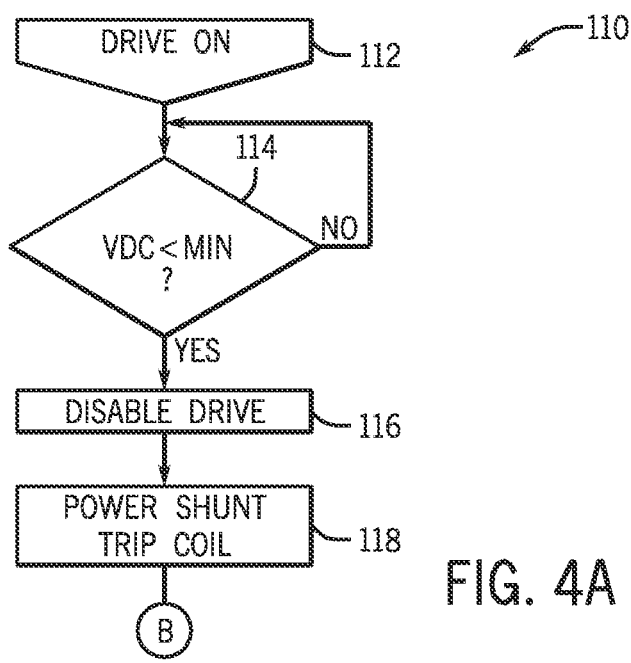
FIGS. 4A-4B illustrate a flow chart representing a process for resetting the pre-charge circuitry of FIG. 2 when a DC voltage drop is detected, in accordance with an embodiment.
Figure 4B:
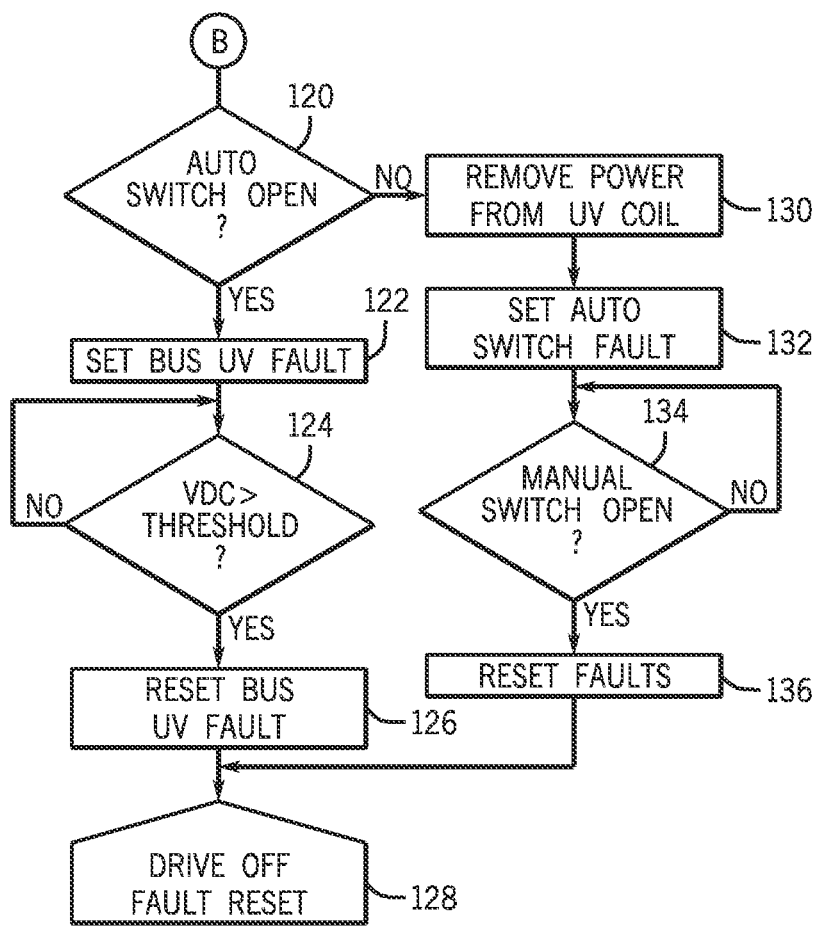
Figure 5A:
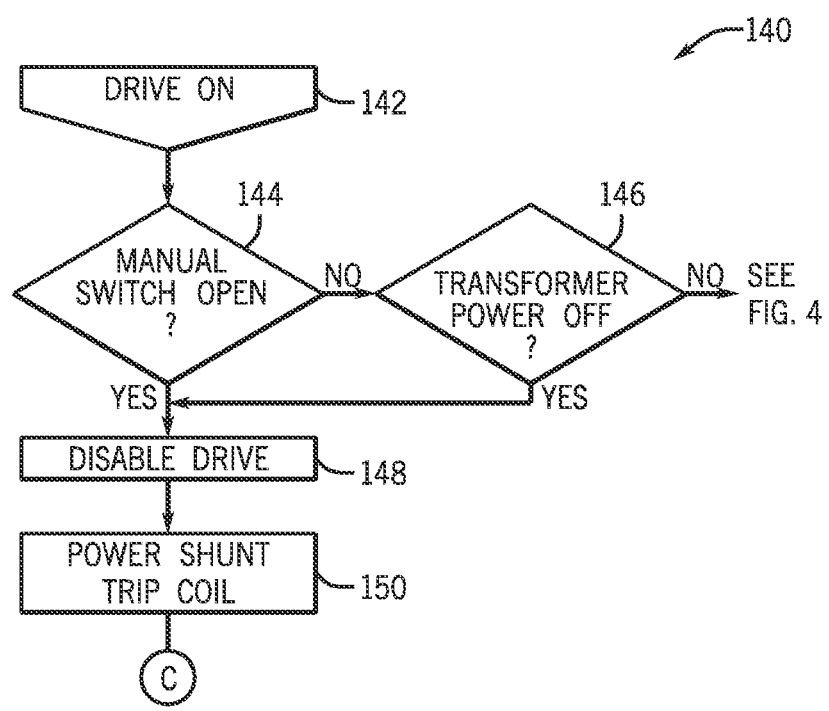
FIGS. 5A-5B illustrate a flow chart representing a process for isolating a motor drive of FIG. 1, in accordance with an embodiment.
Figure 5B:
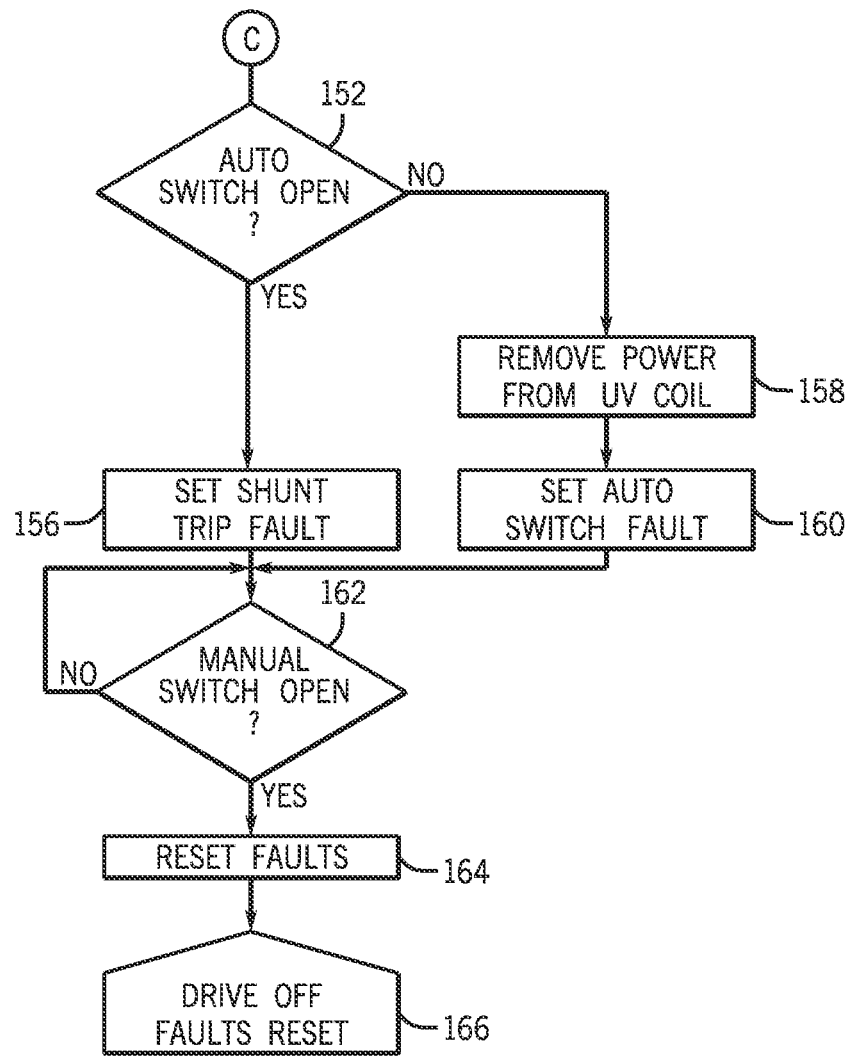

More detailed explanations of various embodiments for operating the pre-charge circuitry 40 in a motor drive 12 are discussed in the flow charts of FIGS. 3-5. FIGS. 3A-3B illustrate a flow chart representing initializing a pre-charge operation. FIGS. 4A-4B and 5A-5B illustrate flow charts representing processes for resetting the pre-charge circuitry 40 in various fault conditions. More specifically, FIGS. 4A-4B illustrate a flow chart for resetting the pre-charge circuitry 40 if a drop in the DC bus voltage is detected. FIGS. 5A-5B illustrate a flow chart for isolating the drive 12 from the common DC bus 14 if the manual switch is opened during drive operation or if the pre-charge circuitry transformer turns off. As the flow charts of FIGS. 3A-5B refer to components discussed with respect to FIGS. 1 and 2, the flow charts of FIGS. 3A-5B may each be discussed concurrently with FIGS. 1 and 2. Furthermore, as used herein, the high side manual switch 54 and low side manual switch 52 may be referred to generally as the manual switch 50. Similarly, the high side automatic switch 62 and the low side automatic switch 64 may be referred to generally as the automatic switch 60, though in some embodiments, the pre-charge control circuitry 66 may control each of the high side and low side automatic switches 62 and 64 independently.

Beginning first with FIGS. 3A-3B, a DC pre-charge operation may begin (block 72) when the motor drive 12 is off and any previously detected faults have been reset. In this condition, the automatic switch 60 may be open. The pre-charge control circuitry 66 may determine (block 74) whether the manual switch 50 is closed. In some embodiments, the manual switch 50 may be closed or opened by an operator of the motor drive 12 or the power network 10, and the manual switch 50 may be manually closed by the operator before activating the drive inverter 22 of a motor drive 12. If the manual switch 50 is closed, a pre-charge operation may be initialized, and the pre-charge control circuitry 66 may start (block 76) a pre-charge timer, which may be set to a period of time in which the DC bus is charged to an appropriate voltage. To pre-charge the internal DC bus 32 of the motor drive 12, the pre-charge control circuitry 66 may draw power from the common DC bus 14 until a suitable threshold voltage is drawn to the internal DC bus 32. As the capacitor 38 is connected across the internal DC bus 32, reaching a suitable threshold voltage on the internal DC bus 32 may indicate that the capacitor 38 has been appropriately charged. For example, the threshold may be approximately 700V in some embodiments, though the threshold may be different depending on different types of motor drives 12 or drive networks 10. In some embodiments, during pre-charging, current flows through the pre-charge resistors 56 and 58. As such, the current draw on the DC bus 32 may be controlled while the capacitor 38 charges.

The pre-charge control circuitry 66 may measure the DC bus voltage to determine (block 78) whether the DC bus voltage is above the threshold, indicating that pre-charging is complete. The control circuitry 66 may continue to detect the DC bus voltage until the pre-charge timer is timed out. If the control circuitry 66 determines (block 80) that the pre-charge timer has timed out while the threshold voltage has not been met, the control circuitry 66 may set (block 82) the pre-charge operation to a fault condition, as an appropriate DC bus voltage has not been reached within the pre-charge timer period. In some embodiments, a pre-charge fault may indicate to an operator that one or more components of the pre-charge operation must be repaired, replaced, and/or reset. The pre-charge fault may be reset (block 84) to restart the pre-charge operation 70.

In some embodiments, if the pre-charge control circuitry 66 determines (block 78) that the DC bus voltage is greater than the threshold, the control circuitry 66 may proceed to close the automatic switch to begin operating the motor drive in a pre-charge bypass mode. The control circuitry 66 may determine (block 86) whether the transformer 68 coupled to the control circuitry 66 is on. In some embodiments, the control circuitry 66 may use the transformer 68 to supply power for controlling the switching of the automatic switch 60. If the transformer 68 is on, the control circuitry 66 may power (block 88) an under voltage (UV) coil at the automatic switch 60. The UV coil may be coupled to motors of the automatic switch 60, and by powering the UV coil, the control circuitry 66 may substantially control the operations of the automatic switch 60. The control circuitry 66 may also charge (block 90) a motor operator coil of the automatic switch 60 to a charge sufficient for closing (block 92) the automatic switch 60. In some embodiments, charging the motor operator coil may involve applying power to the motor operator coil for a period of time and removing the power once charging is complete.

The control circuitry 66 may verify (block 94) that the automatic switch 60 has been closed. If the automatic switch 60 has not been properly closed, the control circuitry may remove (block 96) power from the UV coil and set (block 98) the automatic switch at fault. Such a fault may indicate to an operator that the automatic switch needs repair or attention. If the control circuitry 66 determines (block 94) that the automatic switch 60 has properly closed, the control circuitry 66 may indicate a successful pre-charge operation, and the motor drive 12 may be activated in a pre-charge bypass mode (block 100), where the automatic switch 60 is closed, and the inverter circuitry 22 is operating in the motor drive 12.

FIGS. 4A-4B illustrate a flow chart representing a process for resetting the pre-charge circuitry 40 if a drop in the DC bus voltage is detected while the motor drive 12 is operating. As used herein, a motor drive 12 having a drop in DC bus voltage during operation may be referred to as a faulted drive. The pre-charge reset process 110 may begin (block 112) when the motor drive 12 is on and the pre-charge control circuitry 66 determines (block 114) that the DC bus voltage has dropped below a minimum threshold. In some embodiments, if the DC bus voltage drops below the minimum threshold, various components may be susceptible to damage, particularly for high power DC input drives. The minimum threshold may depend on various factors, such as the components used in the motor drive 12, the current limits of the DC bus 32, and/or other operating conditions of the motor drive 12. When a voltage drop is detected (block 114), either the pre-charge control circuitry 66 or the driver circuitry 46 or any other suitable controller of the motor drive 12 may disable (block 116) the inverter 22 of the motor drive 12. In one embodiment, the driver circuitry 46 may disable the inverter 22 by stopping the switching of the switches 42.

After disabling the inverter 22, the pre-charge control circuitry 66 may apply (block 118) power to a shunt trip coil to open the automatic switch 60. The pre-charge control circuitry 66 may verify (block 120) whether the automatic switch 60 is open. If the automatic switch 60 is open, the control circuitry 66 may determine that the drop in DC voltage is due to a fault in the UV coil, and the control circuitry 66 may set (block 122) a bus UV fault. In some embodiments, the pre-charge circuitry 40 may be suitable for recharging the DC bus after a voltage drop. As the manual switch 50 is closed, the faulted drive may draw DC voltage from the common bus 14 until the voltage of the common DC bus 32 is again above the threshold discussed in FIGS. 3A-3B (e.g., 700V). Once the control circuitry 66 determines (block 124) that the DC bus voltage is above the threshold, the control circuitry 66 may reset (block 126) the bus UV fault, and the motor drive 12 may be turned off (block 128). In one embodiment, the control circuitry 66 may then turn the motor drive 12 by following the pre-charge operation 70 described above with reference to FIGS. 3A-3B.

If the pre-charge control circuitry determines (block 120) that the automatic switch is still closed, the control circuitry 66 may remove (block 130) power from the UV coil and set (block 132) a fault for the automatic switch 60. In some embodiments, the control circuitry 66 may provide an indication for an operator to open the manual switch 50. Once the control circuitry 66 determines (block 134) that the manual switch 50 is open, the control circuitry 66 may reset (block 136) the automatic switch fault and any other faults. The process 110 may end (block 128) with the motor drive 12 turned off and the faults reset. The motor drive 12 may then be prepared for pre-charge mode (e.g., performing the process 70 in FIGS. 3A-3B).

FIGS. 5A-5B illustrate a flow chart representing a process for isolating the drive 12 from the common DC bus 14 if the manual switch 50 is switched open or if the transformer 68 is turned off during operation of the drive 12. Typically, the manual switch 50 may remain closed through pre-charge and after the drive 12 is in operation. A manual switch 50 which opens during drive operation may prevent the drive 12 from automatically pre-charging if voltage drops are detected. Further, if the transformer 68 loses power during drive operation, the pre-charge control circuitry 66 may not control the automatic switch 60 in response to voltage drops. Therefore, in some embodiments, an open manual switch 50 or a faulty transformer 68 may be fault conditions that prevent the drive 12 from properly pre-charging. As such, a motor drive 12 having conditions that may prevent the drive 12 from properly pre-charging may be isolated from the common DC bus 14.

The drive isolation process 140 may begin (block 142) when the drive 12 is on and the pre-charge control circuitry 66 determines (block 144) that the manual switch 50 is open. Furthermore, the control circuitry 66 may also determine (block 146) whether the transformer 68 is powered off. If the control circuitry 66 determines (blocks 144 and 146) that either the manual switch is open or the transformer 68 power is off, the control circuitry 66 may disable (block 148) the drive 12 to protect the drive 12 from possible voltage fluctuations on the DC bus.

Once the drive 12 is disabled, the control circuitry 66 may then apply (block 150) power to the shunt trip coil to open the automatic switch 60. The control circuitry 66 may determine (block 152) whether the automatic switch 60 is open. If the automatic switch 60 is open, the control circuitry 66 may set (block 156) a shunt trip fault. The shunt trip fault may indicate to an operator that the shunt trip has been powered to open the switch and break the DC bus at the automatic switch 60. If the control circuitry 66 determines (block 152) that the automatic switch 60 is not open, the control circuitry 66 may remove (block 158) power from the UV coil and set (block 160) an automatic switch fault, indicating to an operator that the automatic switch is in fault because it is still closed.

Once either of the shunt trip or automatic switch faults are set (blocks 156 and 160), the control circuitry 66 may determine (block 162) whether the manual switch 50 is open. In some embodiments, the control circuitry 66 may provide an indicator that the faulted drive has one or more fault conditions, and in some embodiments, the control circuitry 66 may provide indication for an operator to open the manual switch 50. Once the manual switch 50 is open, the control circuitry 66 may reset (block 164) the faults of the drive 12, and the process 140 may end (block 166) with the drive off, the faults reset, and the drive 12 isolated from the DC bus 14.

In some embodiments, the control circuitry 66 may output the faults (e.g., automatic switch fault, pre-charge fault, bus UV fault, shunt trip fault, etc.) to an operator (e.g., via a display or saved in memory to be retrieved by the operator), such that the operator may address one or more fault conditions. For instance, based on the fault conditions output to an operator, the operator may replace the automatic switch 60, replace the transformer 68, or repair the pre-charge circuitry 40, etc.

In some embodiments as discussed in FIGS. 4A-4B, using a configuration with the automatic switch 60 and the manual switch 50, a motor drive 12 may automatically switch from a pre-charge bypass mode during normal drive operations to a pre-charge mode when DC bus voltage drops are detected. Therefore, because the switch to pre-charge mode may be substantially automatic, an operator need not constantly monitor multiple motor drives 12 for voltage drops or other faults. By automatically switching to pre-charge mode during DC voltage drops, the motor drive 12 may recover safely without causing substantial harm to motor drive components (e.g., the capacitor 38, the switches 42, etc). If the fault condition cannot be cured by operating the motor drive 12 in pre-charge mode, a motor drive 12 in fault may be isolated from a common bus 14, such that other motor drives 12 not in fault may not be harmed and/or may continue to operate in the power system 10. Moreover, due to the relatively small size of the automatic switch 60, the size of the motor drive 12 may be reduced, as the drive 12 may not need to use a relatively larger circuit breaker for drive isolation.

Figure 6:
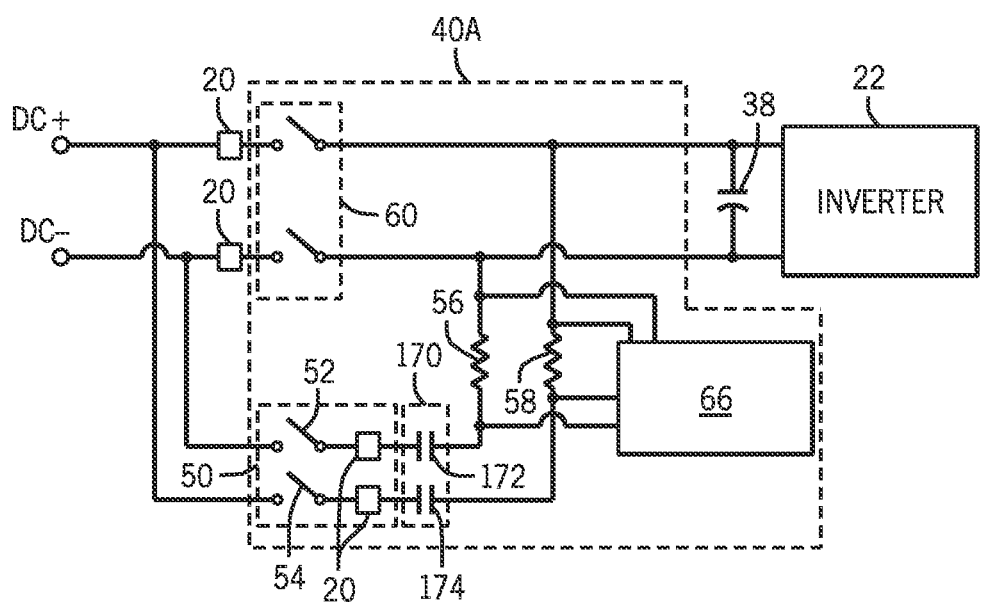
FIG. 6 is a diagrammatical representation of pre-charge circuitry in a motor drive of FIG. 1, in accordance with an embodiment.

The manual switches 50 may also be automatically protected by the control circuitry 66 in some embodiments. As discussed in the processes for resetting various fault conditions in FIGS. 4 and 5, determining (blocks 134 and 162, respectively) whether the manual switch 50 is open may involve providing indication for an operator to open the manual switch 50 if it is determined to not be open. However, in some embodiments, as illustrated in the pre-charge circuitry 40A of FIG. 6, the pre-charge circuitry 40A may include contactors 170 (contactor 172 and contactor 174) connected in series between the manual switches 50 and the pre-charge resistors 56 and 58. In some embodiments, after pre-charge is complete, the automatic switches 60 may be closed by the control circuitry 66. The control circuitry 66 may also open the contactors 172 and 174. If a fault (e.g., a short circuit) occurs while the drive 12 is in operation, the control circuitry 66 may open the automatic switches 60. If the manual switches 50 are still closed when the automatic switches 60 are open during a short circuit, the pre-charge resistors 56 and 58 may be damaged by an influx of current. In some embodiments, the contactors 172 and 174 may be open by the pre-charge control circuitry 66 to open the current path to the pre-charge resistors 56 and 58 and protect the pre-charge resistors 56 and 58 from the current influx. The control circuitry 66 may then determine a more suitable time (e.g., safer currents on the DC bus for the pre-charge resistors 56 and 58) to close the contactors 170 and starting a pre-charge operation.

Figure 7:
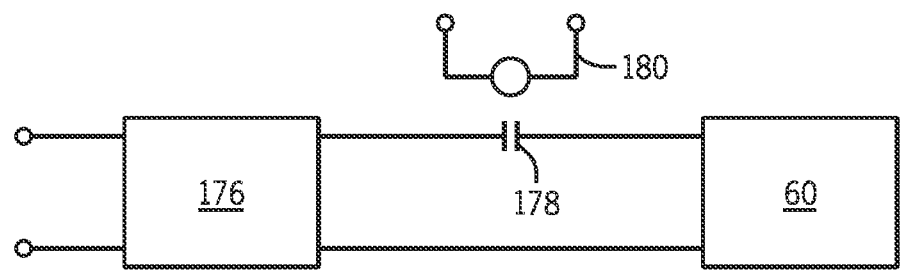
FIG. 7 is a diagrammatical representation of an undervoltage delay element in pre-charge circuitry of FIG. 6, in accordance with an embodiment.

Furthermore, in some embodiments as illustrated in FIG. 7, the pre-charge circuit 40 may include an undervoltage (UV) delay element 176 connected to an undervoltage trip coil of the automatic switches 60. During fault conditions such as a dip or drop in DC bus voltage (e.g., as discussed with respect to FIGS. 4A-4B), the pre-charge control circuitry 66 may disable the drive 12 and open the automatic switches 60 as soon as a dip in voltage is detected. For example, if the motor drive 12 operates with 240V, a dip beneath the 240V threshold may cause the control circuitry 66 to open the automatic switches 60. However, in some instances, the automatic switches 60 may not be prepared to open. For example, if the inverter 22 has not been fully disabled, opening the automatic switches 60 may break the current flow while the motor drive 12 is supporting a full load, which may cause damage to the automatic switches 60. The UV delay element 176 may receive an AC voltage of $240V_{AC}$ and output a DC voltage of $240V_{AC}$. The $240V_{AC}$ may be held for a length of time (e.g., 3 seconds) in such voltage dip conditions to the UV trip coil. As such, the control circuitry 66 may have sufficient time to fully disable the inverter 22 before opening the automatic switches 60, decreasing the possibility of damage to the automatic switches 60.

In some embodiments, the pre-charge circuit 40 may also include a contactor 178 connected in series with the automatic switch 60. The contactor 178 may be controlled via a control signal 180 from the control circuitry 66. The control circuitry 66 may power a coil to open the contactor 178 and trip the automatic switch 60. In some embodiments, the control circuitry 66 can control the contactor 178 to trip the automatic switch 60 without a UV delay element 176. Tripping the automatic switch 60 may provide sufficient time for the inverter 22 to be disabled. Once the inverter 22 is disabled, the control circuitry 66 may open the automatic switch 60.

Figure 8:
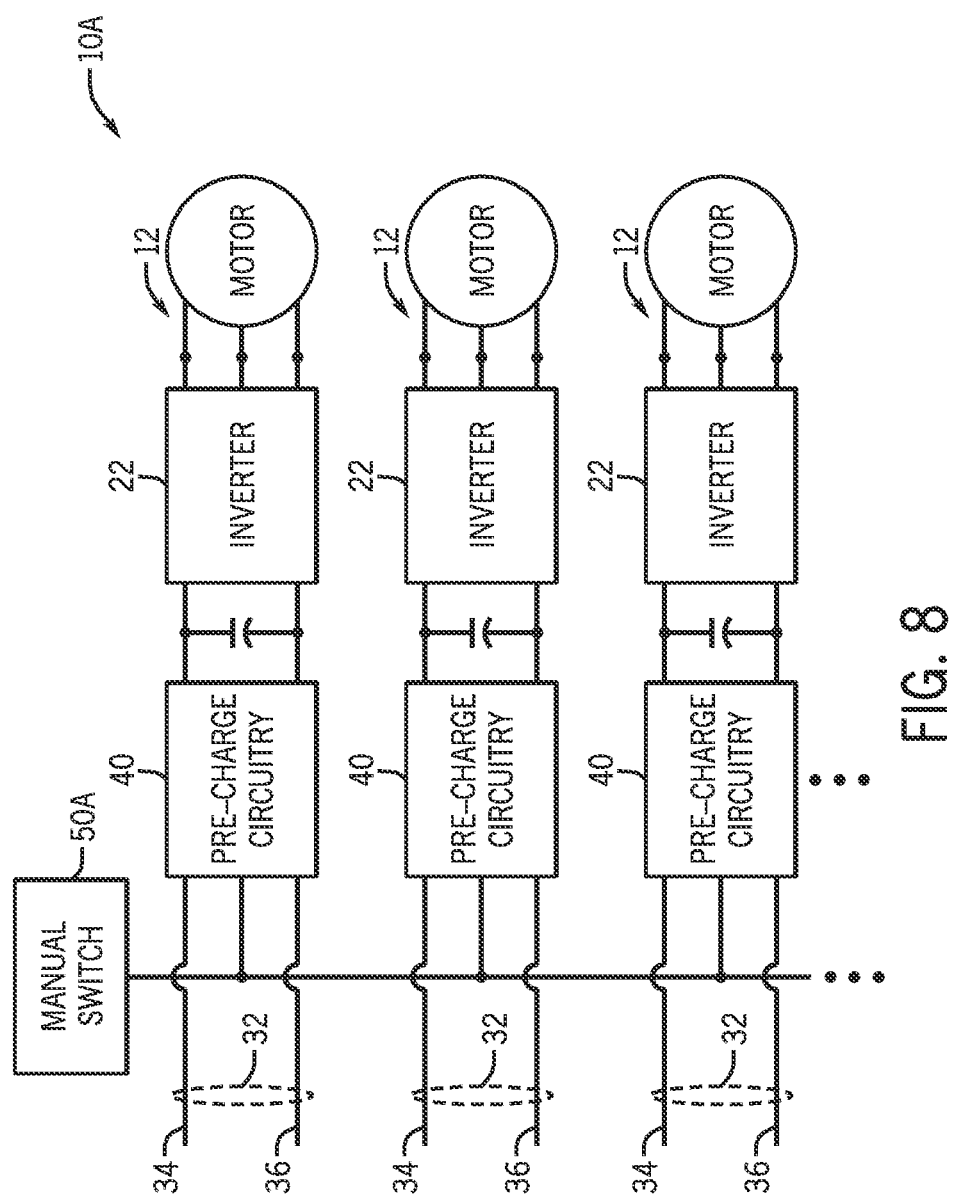
FIG. 8 is a diagrammatical representation of a power distribution network having a switch shared by multiple motor drives, in accordance with an embodiment.

Furthermore, in some embodiments, the manual switches 50 and automatic switches 60 are individually coupled to each motor drive 12 in the network 10, as illustrated in FIG. 2. By individually opening the manual and automatic switches 50 and 60 on one drive in fault condition, the faulted drive may be isolated from the remaining drives in the network 10, such that the network 10 may still function, and appropriate attention or repairs may be given to the faulted drive. In other embodiments, the manual switches 50 and/or the automatic switches 60 may be connected to more than one motor drive 12 for further space savings. For instance in one embodiment, as illustrated in FIG. 8, one set of manual switches 50A may be connected to all the motor drives 12 in the power network 10A, such that an operator may begin or reset a pre-charge operation for all connected motor drives 12 by switching one manual switch 50A.

While only certain features have been illustrated and described herein, many modifications and changes will occur to those skilled in the art. It is, therefore, to be understood that the appended claims are intended to cover all such modifications and changes.

The invention claimed is:

1. A power system, comprising:
at least one inverter module, wherein the at least one inverter module comprises:
an inverter circuit configured to connect to a direct current (DC) bus;
a capacitive circuit configured to couple across the DC bus; and
a pre-charge circuit configured to charge the capacitive circuit, wherein the pre-charge circuit comprises:
at least one pre-charge resistor;
at least one manual switch configured to connect the at least one pre-charge resistor to the DC bus when closed and disconnect the at least one pre-charge resistor from the DC bus when open;
at least one automatic switch on the DC bus; and
pre-charge control circuitry configured to detect a state of the at least one manual switch and configured to open and close the at least one automatic switch.

2. The power system of claim 1, wherein the pre-charge control circuitry is configured to apply a pre-charge current through the at least one pre-charge resistor when a voltage of the DC bus is below a threshold.

3. The power system of claim 1, wherein the pre-charge control circuitry is configured to open the at least one automatic switch when a voltage of the DC bus is below a threshold.

4. The power system of claim 3, wherein the pre-charge control circuitry is configured to provide an indication to open the at least one manual switch when the voltage is below the threshold.

5. The power system of claim 4, wherein the at least one opened automatic switch and the at least one opened manual switch isolates the at least one inverter module from the power system.

6. The power system of claim 1, wherein the pre-charge circuit comprises at least one contactor configured to connect in series between the at least one manual switch and the at least one pre-charge resistor.

7. The power system of claim 6, wherein the pre-charge control circuitry is configured to open the at least one contactor when a voltage of the DC bus is below a threshold.

8. The power system of claim 1, wherein the pre-charge control circuitry is configured to control a flow of current through the at least one pre-charge resistor for a period of time to sufficiently charge the capacitive circuit to a threshold.

9. The power system of claim 1, wherein the at least one automatic switch comprises at least one motorized molded case switch.

10. The power system of claim 1, wherein the pre-charge circuit comprises at least one under-voltage delay element connected to the at least one automatic switch, wherein the at least one under-voltage delay element is configured to hold a threshold operating voltage on the DC bus for a period of time after a voltage in the DC bus is below the threshold operating voltage.

11. The power system of claim 1, wherein the pre-charge circuit comprises at least one contactor configured to connect to the at least one automatic switch, wherein the at least one contactor is configured to open based on a control signal from the pre-charge control circuitry when a voltage in the DC bus is below a threshold.

12. The power system of claim 1, comprising at least one fuse connected on the DC bus, wherein the at least one fuse is configured to interrupt current flow over the DC bus to the at least one automatic switch during a short circuit condition of the at least one inverter module.

13. A method, comprising:
receiving a first signal indicating that a manual switch is closed, wherein the closed manual switch is configured to couple a DC source in series with a resistor and an internal DC bus, wherein the DC source is coupled to a plurality of inverter modules, each inverter module comprises an inverter circuit, the internal DC bus coupled to the inverter circuit, and a capacitive circuit coupled across the internal DC bus;
automatically closing an automatic switch coupled between the DC source and the internal DC bus when the capacitive circuit has a voltage above a threshold.

14. The method of claim 13, comprising automatically opening the automatic switch when a fault condition is present on at least one of the plurality of inverter modules.

15. The method of claim 13, wherein the first signal indicates that a plurality of switches is closed, wherein each of the plurality of switches is coupled to a respective internal DC bus in each of the plurality of inverter modules.

16. The method of claim 13, wherein the first signal indicates that one manual switch coupled to each respective inverter module in the plurality of inverter modules is closed.

17. The method of claim 13, comprising operating the inverter circuit after the automatic switch is closed.

18. The method of claim 13, comprising disabling the inverter circuit when a fault condition is present on at least one of the plurality of inverter modules.

19. The method of claim 18, wherein the fault condition comprises one or more of a significant voltage drop in the internal DC bus, an opening of the manual switch while the inverter circuit is in operation, or any combination thereof.

20. The method of claim 13, comprising automatically opening a contactor coupled in series with the resistor when a fault condition is present on at least one of the plurality of inverter modules.

21. The method of claim 13, comprising automatically opening a contactor coupled in series with the first switch when a fault condition is present on at least one of the plurality of inverter modules.

22. The method of claim 13, comprising receiving a second signal that the manual switch has been opened after a fault condition present on at least one of the plurality of inverter modules has been removed to reset faults of a respective inverter module in which the fault condition is detected.

23. An inverter module comprising:
a power converter coupled to a capacitive circuit and configured to convert DC power from the capacitive circuit to AC output power;
a first switch coupled between the capacitive circuit and a DC bus;
a second switch configured to couple a resistor in series with the DC bus and the capacitive circuit when closed, wherein the second switch is a manual switch; and
control circuitry configured to automatically close the first switch when a voltage of the capacitive circuit is above a first threshold.

24. The inverter module of claim 23, wherein the control circuitry is configured to automatically open the first switch when a voltage of the capacitive circuit is below a second threshold.

25. The inverter module of claim 24, wherein the control circuitry is configured to automatically close the first switch when the capacitive circuit is above the second threshold.

26. The inverter module of claim 23, comprising power converter drive circuitry configured to substantially control the power converter, wherein the power converter drive circuitry is configured to disable the power converter upon the detection of a fault condition.

\* \* \* \* \*